United States Patent
Smith et al.

(12)

(10) Patent No.: US 6,354,566 B1
(45) Date of Patent: Mar. 12, 2002

(54) LIVE LOADED VALVE STEM PACKING WITH SHAPE MEMORY ALLOY OPTION

(75) Inventors: Gordon M. Smith, Brookshire; Hashimali Merchant, Spring, both of TX (US)

(73) Assignee: General Valve, Inc., Brookshire, TX (US)

(*) Notice: Subject to any disclaimer, the term of this patent is extended or adjusted under 35 U.S.C. 154(b) by 0 days.

(21) Appl. No.: 09/624,434

(22) Filed: Jul. 24, 2000

(51) Int. Cl.[7] ................................................. F16J 15/18
(52) U.S. Cl. ......................... 251/214; 277/511; 277/538
(58) Field of Search ......................... 251/11, 170, 171, 251/174, 214; 277/510, 511, 531, 535, 540, 541, 553, 554, 584, 538; 384/149

(56) References Cited

U.S. PATENT DOCUMENTS

| | | | | |
|---|---|---|---|---|
| 601,614 A | * | 3/1898 | Dudley | 277/523 |
| 3,361,430 A | * | 1/1968 | Reid | 277/436 |
| 3,848,880 A | * | 11/1974 | Tanner | 277/584 |
| 3,940,155 A | * | 2/1976 | Baumle | 277/558 |
| 5,368,312 A | * | 11/1994 | Voit et al. | 277/589 |
| 5,402,983 A | * | 4/1995 | Bernhardt | 251/309 |
| 6,006,778 A | * | 12/1999 | Kim | 137/242 |

* cited by examiner

Primary Examiner—Kevin Shaver
Assistant Examiner—Patrick Buechner
(74) Attorney, Agent, or Firm—Leonard Tachner

(57) ABSTRACT

Live loaded valve stem packing wherein grafoil packing is molded into a metal cap that prevents extrusion of the packing, and has live loading built into the metal cap. This metal cap can be conventional flat spring materials (17-7PH S.S. or 302 S.S.) or a Shape Memory Alloy (commonly known as SMA materials, e.g. Ni—Ti (Nickel-Titanium alloy) or Fe—Si—Mn (Iron-Silicon-Manganese alloy). The cap is designed with a singular hump, entirely along its top surface. On this hump there are two slots through the hump, 180 degrees apart, for ease of removing the packing. Upon assembly of the packing box, the hump is elastically flattened out due to axial loading through the fasteners. As the packing consolidates during service (optionally if the cap is SMA, during temperature increases) the hump deflects to maintain a relatively constant or enhanced axial load on the packing to enhance sealing, even during a fire.

9 Claims, 3 Drawing Sheets

LIVE LOADED VALVE STEM PACKING WITH SHAPE MEMORY ALLOY OPTION

BACKGROUND OF THE INVENTION

1. Field of the Invention

The present invention relates generally to the field of valves and more particularly to sealing a valve by means of packing around the stem of a valve.

2. Background Art

A major problem with valves is leakage past the valve stem and through the packing box. The packing inside the valve stuffing box is designed to compress and fit tight to prevent leaks, but it does not always work effectively. Keeping the right amount of force on the packing can be challenging. Conventional valves have a gland nut or an equivalent for compressing the packing to effect a seal. The gland nut on top of the valve must be carefully adjusted. Put too much load on the packing and it will tamp down and put too much strain on the valve stem when it needs to move. Not enough load, and leaks force their way through the stuffing box. As time goes on, the packing may consolidate anyway. Changes in temperature, constant movement of the valve stem and bolt creep each take their toll, necessitating another adjustment of the gland nut. Live-loading is a technique developed to solve this problem. It uses the forces already in play to automatically adjust the force exerted by the gland nut. Live-loading is really spring loading. Specially designed disc springs called Bellevilles are used to maintain the minimum required packing seal pressure. This prevents leakage due to aging, deterioration or thermal cycling. This provides for a degree of self-adjustment to compensate for wear. Live loading of valve packing is accomplished by storing of energy in spring (Belleville) washers. This technique puts a compressive load on the packing and maintains a relatively leak-tight seal around the stem while allowing the stem to move as necessary during opening and closing. The number of springs varies according to the valve configuration, but it usually is possible to design a group of springs that maintains about 80% of the original design load, even when the packing has seen some consolidation while in service. Packing material should remain flexible throughout the life of the valve. After initial torque, the packing—especially in high temperature applications—will relax radially and axially and must be manually adjusted to effectively seal. With live loading, seal adjustment is done automatically. The use of springs to live-load a valve also provides a guide to help the user determine if there is sufficient bolt torque on the packing. The visual flat position of the spring will indicate that the springs are fully loaded. The visual position of the spring being relaxed indicates torque loss or insufficient torque loading on the packing. The springs produce a constant force against the packing that can be more than 20 times greater than could be applied manually with a gland nut. Even with the use of only one spring, the stored energy available to maintain the force on the packing is 4 times greater than the manual force normally used on the gland nut to maintain packing load. Live loaded valve stem packing, consists of a stack of disk springs placed under the valve's gland nuts. The disks have a spring constant such that the packing axial stress remains within a narrowly defined band of values during its whole service life. As the packing consolidates in service, the springs expand to maintain a relatively constant load on the packing. Disc springs can be stacked in parallel, nested over each other, or placed in series opposing each other. Each arrangement gives a different spring characteristic, of course.

SUMMARY OF THE INVENTION

The present invention provides live loaded valve stem packing wherein grafoil packing is molded into a metal cap which not only prevents grafoil packing from extruding after it is compressed into the packing box, but also has the feature of live loading built into the metal cap. This metal cap can be made from two different materials. The first one is the conventional flat spring materials (17-7PH S.S. or 302 S.S.) used by the Belleville washer manufacturers. The second one is a Shape Memory Alloy {commonly known as SMA materials, e.g. Ni—Ti (Nickel-Titanium alloy) or Fe—Si—Mn (Iron-Silicon-Manganese alloy). The conventional or SMA material metal cap is designed with a singular hump, entirely along the top surface of the metal cap. On this hump, there are two slots, 180 degrees apart, through the hump for the purpose of removing the packing after it is installed. This hump is the live loading feature of the invention. After the packing is installed in the packing box in the bonnet, the packing gland is then installed to the bonnet with its four associated fasteners. Upon complete assembly of the packing box, the hump is elastically flattened out due to the controlled (bolt torque) axial loading through the fasteners. As the packing consolidates with the valve in service or the packing box components relax during thermal cycling, the hump deflects to maintain a relatively constant load on the packing. In essence it is a continuous in-service adjustment. SMA material metal caps can also be used with the same philosophy. The invention optionally employs SMA material metal caps which "senses" increase in temperature and reacts to these changes by reverting back to it as manufactured state (in this case the hump deflects) to provide a constant axial load on the packing so it can continue to provide its sealing function even during a fire.

OBJECTS OF THE INVENTION

It is therefore a principal object of the present invention to provide a valve stem packing assembly comprising a metal cap for the packing and having a spring-like hump which deflects during consolidation to maintain a relatively constant load on the packing.

It is another object of the invention to provide a valve stem packing assembly comprising a metal cap for the packing, the cap being made of a shape memory alloy to compensate for increases in temperature.

It is still another object of the invention to provide a live loaded valve stem packing assembly using a packing retainer metal cap having a spring-like hump serving the live loading function.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF THE INVENTION

Figures 1, 2:
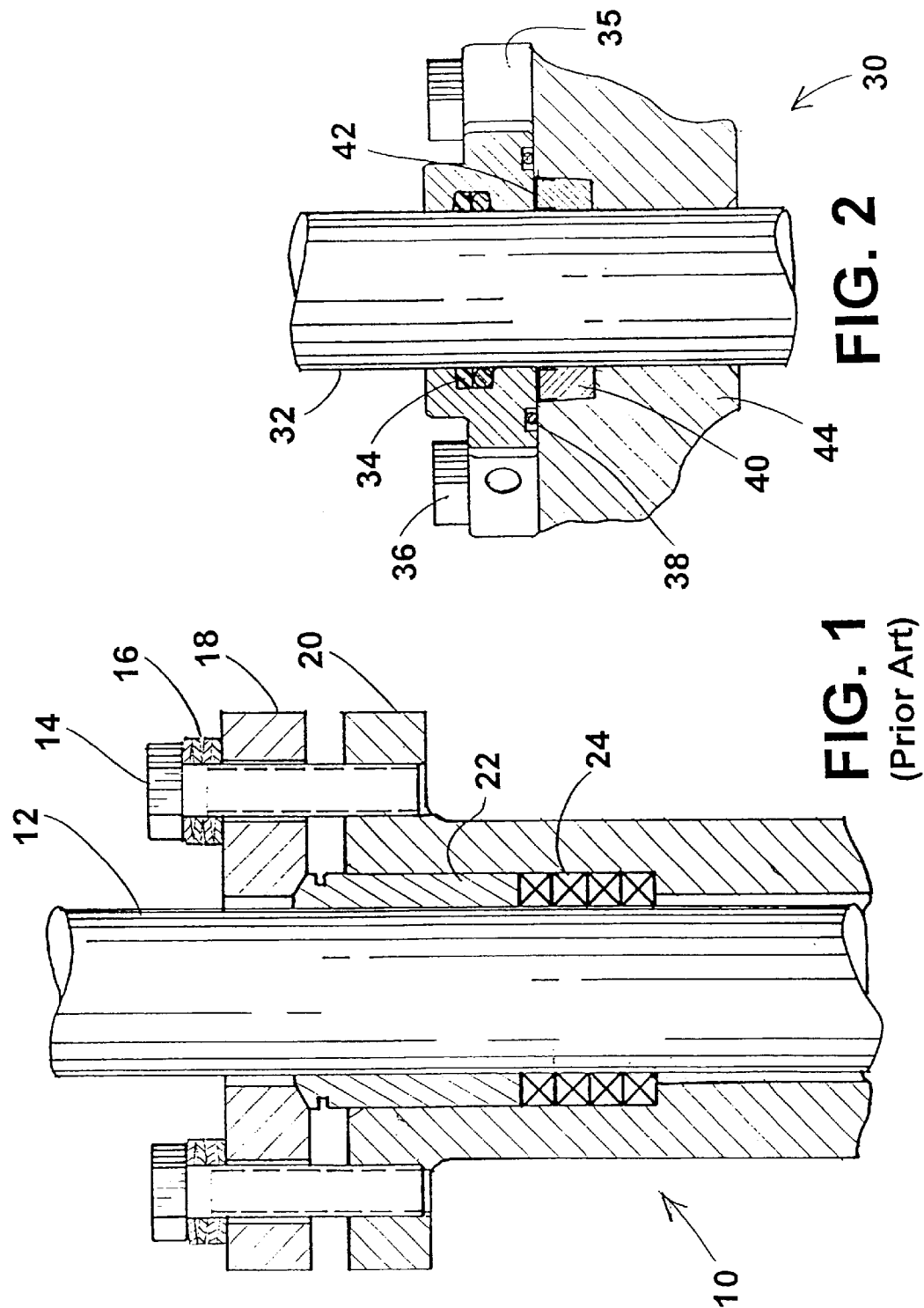
FIG. 1 is a partially cross-sectioned view of a prior art valve stem assembly.
FIG. 2 is a partially cross-sectioned view of the valve stem assembly of the present invention.

Referring to FIG. 1, it will be seen that in a prior art valve stem assembly 10, a valve stem 12 is surrounded by a plurality of stacked packing rings. Rings 24 are secured around stem 12 by a packing follower 22 and packing gland 18, the latter being secured to a valve bonnet 20 by a plurality of fasteners 14 loaded by a plurality of Belleville spring washers 16. Washers 16 are stacked to press on the gland 18 and on the follower 22 providing a live load.

In the present invention, seen in FIGS. 2 through 5, the stem assembly 30, encloses a stem 32 with a single packing ring 40, the top of which is enclosed by an annular metal cap 42 which is tightly pressed over the packing ring to form an integrated unit.

Figure 3:
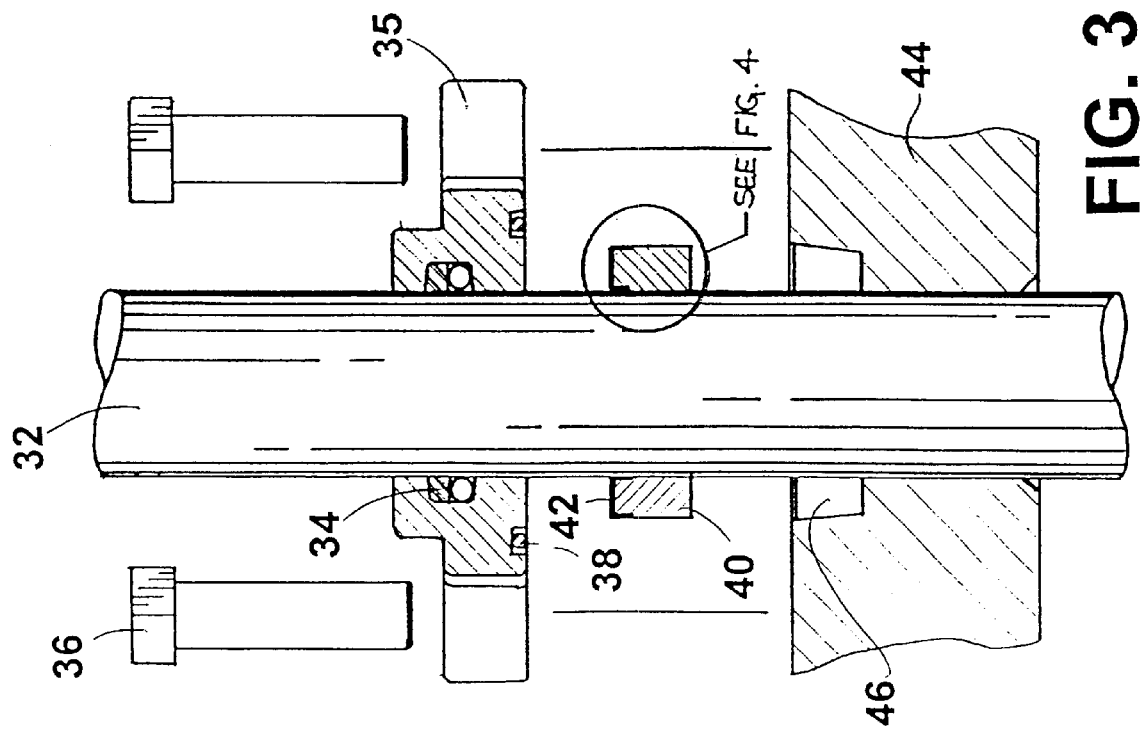
FIG. 3 is an exploded view of the assembly of FIG. 2.

Other components of the assembly 30 comprise O-ring and back-up ring 34, packing gland 35, packing gland fasteners 36 and O-ring 38, all contributing to the function of enclosing the stem 32 and securing packing ring 40 to a valve bonnet 44. FIG. 3 illustrates the packing box 46 which is formed in the bonnet 44 for receiving the packing ring 40.

Figure 4:
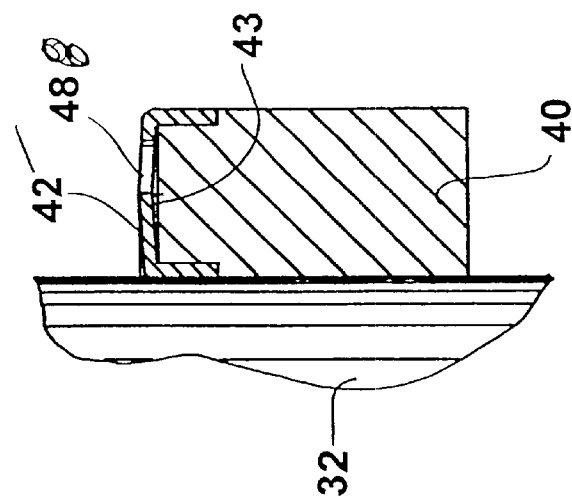
FIG. 4 is an enlarged view of the encircled area of FIG. 3.
Figure 5:
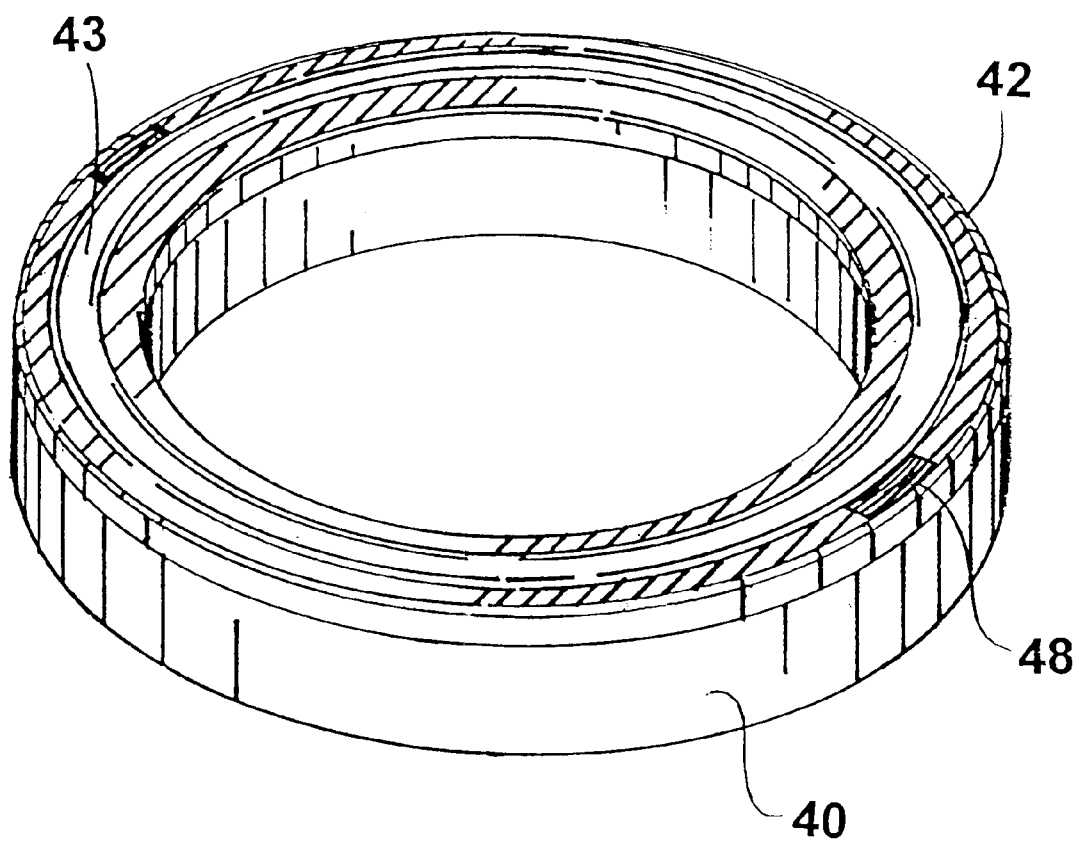
FIG. 5 is a three-dimensional view of the metal cap and packing arrangement used in the invention.

The unique "humped" configuration of metal cap 42 seen in FIGS. 4 and 5, provides a continuous, generally convex shaped annular hump 43 which acts as a spring and is elastically flattened out during tightening of fasteners 36 for compressing packing gland 35 against the packing ring 40. At least two slots 48 provide a ring removal opportunity to pry up the metal cap and packing ring.

As the packing gland fasteners remain fixed and the packing consolidates, the metal cap hump deflects to maintain a relatively constant load on the packing. In addition, the metal cap extends over the sides of the packing ring to provide an anti-extrusion effect while the hump provides consolidation compensation effect.

When the metal cap is made of a shape memory alloy such as nickel-titanium alloy or iron-silicon-manganese alloy, the cap effectively "senses" temperature increases such as when there is a fire in the fluid through the valve. These temperature increases cause the shape memory alloy to revert to its originally manufactured state causing the hump 43 to deflect and increase the axial load on the packing. In this way the packing sealing effect is increased during fires.

Having thus disclosed preferred embodiments of the invention, it being understood that other embodiments are contemplated and will now occur to those having the benefit of the above disclosure, what is claimed is:

1. In a valve having a cylindrical elongated stem, a packing ring assembly for installation in a packing box of a valve bonnet for sealing around the stem while permitting axial and rotational motion of the stem; the packing ring assembly comprising:

a packing ring having an annular shape and a generally rectangular cross-section, one surface of said ring being enclosed by an annular cap, said cap having a convex-shaped hump along at least a portion of its length;

a packing gland having fasteners for attachment to said valve bonnet and tightening of said gland against said annular cap, said hump providing live loading of said packing ring to compensate for consolidation of said packing ring over time.

2. The assembly recited in claim 1 wherein said annular cap extends partially over the inner and outer vertical surfaces of said packing ring to resist extrusion of said packing ring.

3. The assembly recited in claim 1 wherein said annular cap comprises at least one slot for facilitating removal of said cap and ring from said packing box.

4. The assembly recited in claim 1 wherein said cap is made of metal.

5. The assembly recited in claim 1 wherein said cap is made of a shape memory alloy which increases loading as temperature increases beyond a threshold.

6. A packing ring assembly for use in a valve having an elongated stem for sealing the valve around the stem; the assembly comprising:

a packing ring having an annular shape and being press fit into a metal cap which encloses one surface of the ring;

said metal cap having at least one generally convex portion which is compressed into a spring-loaded configuration upon installation of said assembly into said valve.

7. The assembly recited in claim 6 wherein said metal cap extends partially over the inner and outer vertical surfaces of said packing ring to resist extrusion of said packing ring.

8. The assembly recited in claim 6 wherein said metal cap comprises at least one slot for facilitating removal of said cap and ring.

9. The assembly recited in claim 6 wherein said cap is made of a shape memory alloy which increases loading as temperature increases beyond a threshold.

* * * * *